(12) United States Patent
Raskar et al.

(10) Patent No.: US 7,780,364 B2
(45) Date of Patent: Aug. 24, 2010

(54) APPARATUS AND METHOD FOR REDUCING GLARE IN IMAGES

(75) Inventors: Ramesh Raskar, Cambridge, MA (US); Cyrus A. Wilson, Mountain View, CA (US); Amit K. Agrawal, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 233 days.

(21) Appl. No.: 12/113,359

(22) Filed: May 1, 2008

(65) Prior Publication Data

US 2009/0273843 A1 Nov. 5, 2009

(51) Int. Cl.
*G03B 7/00* (2006.01)
*G03B 9/02* (2006.01)

(52) U.S. Cl. .................. 396/505; 396/241

(58) Field of Classification Search .......... 396/505, 396/506, 241
See application file for complete search history.

(56) References Cited

U.S. PATENT DOCUMENTS

2002/0097490 A1* 7/2002 Endo et al. ............... 359/388
2003/0189882 A1* 10/2003 Getreuer et al. .......... 369/44.23
2006/0209399 A1* 9/2006 Mikuriya et al. .......... 359/388

OTHER PUBLICATIONS

McCann et al., "Veiling glare: The dynamic range limit of HDR images," Human Vision and Electronic imaging XII, SPIE, vol. 6492, 2007.
Burak Bitlis et al. "Parametric point spread function modeling and reduction of stray light effects in digital still cameras," Computational Imaging V, SPIE 6498, pp. 29-31, 2007.
Sen et al., "Dual photography," ACM Trans. Graph. 24, pp. 745-755 2006.
Garg et al. "Symmetric photography: Exploiting data-sparseness in reflectance fields," Rendering Techniques 2006, 17th Eurographics Workshop on Rendering, pp. 251-262, 2006.
Talvala et al, "Veiling glare in high dynamic range imaging," ACM Trans. Graph. 26,3 37:1-37:9, Jul. 2007.

* cited by examiner

*Primary Examiner*—Rodney E Fuller
(74) *Attorney, Agent, or Firm*—Dirk Brinkman; Gene Vinokur (57) ABSTRACT

Glare is reduced by acquiring an input image with a camera having a lens and a sensor, in which a pin-hole mask is placed in close proximity to the sensor. The mask localizes the glare at readily identifiable pixels, which can then be filtered to produce a glare reduce output image.

19 Claims, 8 Drawing Sheets

APPARATUS AND METHOD FOR REDUCING GLARE IN IMAGES

FIELD OF THE INVENTION

This invention relates generally to computational photography, and more particularly to reducing glare in images acquired by cameras.

BACKGROUND OF THE INVENTION

It is difficult to acquire a clear image of a scene that includes a bright light source in or near the field of view the camera. Glare reduces contrast and causes image fog and large area ghosts. Glare is hard to avoid and disrupts every optical system, including the human eye. Glare can be due to Fresnel reflection at lens surfaces, and diffusion in lenses. However, the two are often indistinguishable in an image.

International Organization for Standardization (ISO) standard 9358, 1994, describes a procedure for measuring glare and defines a veiling glare index as a ratio of the luminance in the center of a black target to the luminance of the surrounding large area uniform illuminant.

McCann et al. measured glare in multi-exposure high-dynamic range (HDR) images, McCann et al., "Veiling glare: The dynamic range limit of HDR images," Human Vision and Electronic Imaging XII, SPIE, vol. 6492, 2007. Bitlis et al. constructed a parametric model for glare effects in images, "Parametric point spread function modeling and reduction of stray light effects in digital still cameras," Computational Imaging V, SPIE 6498, pp. 29-31, 2007. A 4D to 8D transport tensor between light source and sensor have been developed for relighting and view interpolation, Sen et al., "Dual photography," ACM Trans. Graph. 24, pp. 745-755 2006, and Garg et al. "Symmetric photography: Exploiting data-sparseness in reflectance fields," Rendering Techniques 2006, 17th Eurographics Workshop on Rendering, pp. 251-262, 2006. Those methods can potentially be used to characterize glare, but they do not reduce or decompose glare on the image sensor of the camera. To reduce glare, some methods post-process images that already contain glare via a deconvolution.

Lenses can be designed to reduce glare by coating and shaping the lenses. A 4% to 8% transmission loss due to reflection means that a five to ten element lens can lose half the incident light and significantly increase reflection glare. Anti-reflective coatings make use of the light-wave interference effect. Vacuum vapor deposition coats the lens with a ¼ wavelength thin film using a $\sqrt{n}$ refractive index substance, where n is the index of refraction. Multi-layered coating reduces reflection to 0.1%. However, this is insufficient to deal with light sources which are more than four orders of magnitude brighter than other scene elements. Ancillary optical elements such as filters also increase the possibility of flare effects. Digital camera sensors are more reflective than film.

Meniscus lenses, which have a curved profile can act as a spherical protective glass in front of the lens assembly, prevent unwanted focused reflection from the sensor. The curved profile defocus causes large area flare rather than ghosts. Lens makers use an electrostatic flocking process to directly apply an extremely fine pile to surfaces requiring an anti-reflection finish. The pile stands perpendicular to the wall surfaces acting as Venetian blinds. This is an effective technique for lenses with long barrel sections.

Structural techniques include light blocking grooves and knife edges in lenses to reduce the reflection surface area of lens ends. Hoods or other shading device are recommended for blocking undesired light outside the viewing area.

SUMMARY OF THE INVENTION

Glare reduces image contrast and arises from multiple scattering of light inside the camera's body and lens optics. Therefore, the embodiments of the invention provide an apparatus and method for reducing glare. A 4D ray-space between the camera lens and sensor is analyzed statistically to reduce glare artifacts. In the 4D ray-space, glare behaves as high frequency noise and can be reduced by replacing intensities values of bright outlier pixels with intensities from adjacent pixels, using linear interpolation.

The invention provides a practical solution to analyze the 4D statistics without significantly compromising the resolution of the output image. Unlike conventional light field cameras, the invention does not need to reversibly encode the spatial structure of the 4D ray-space. Hence, the constraints for the camera are simple.

Although diffuse scattering of the lens introduces non-removable 4D low-frequency glare, the invention produce useful solutions in a variety of common scenarios. The invention can handle images taken while the lens is directly exposed to the sun, and images taken without a hood. The invention can reduce the effect of dust on the lens and reduces loss of contrast due to camera body reflections.

In one embodiment, a mask with pin-holes is place in close proximity, e.g., ≈1.2 mm, to the sensor. The pin-holes disperse the incoming light rays over small circular areas of pixels of the sensor directly underneath the pin-holes. Statistics of pixel intensities values are determined in an input image and pixels are replaced according to the statistics to produce an output image with reduced glare.

DETAILED DESCRIPTION OF THE PREFERRED EMBODIMENTS

Camera

Figure 1A:
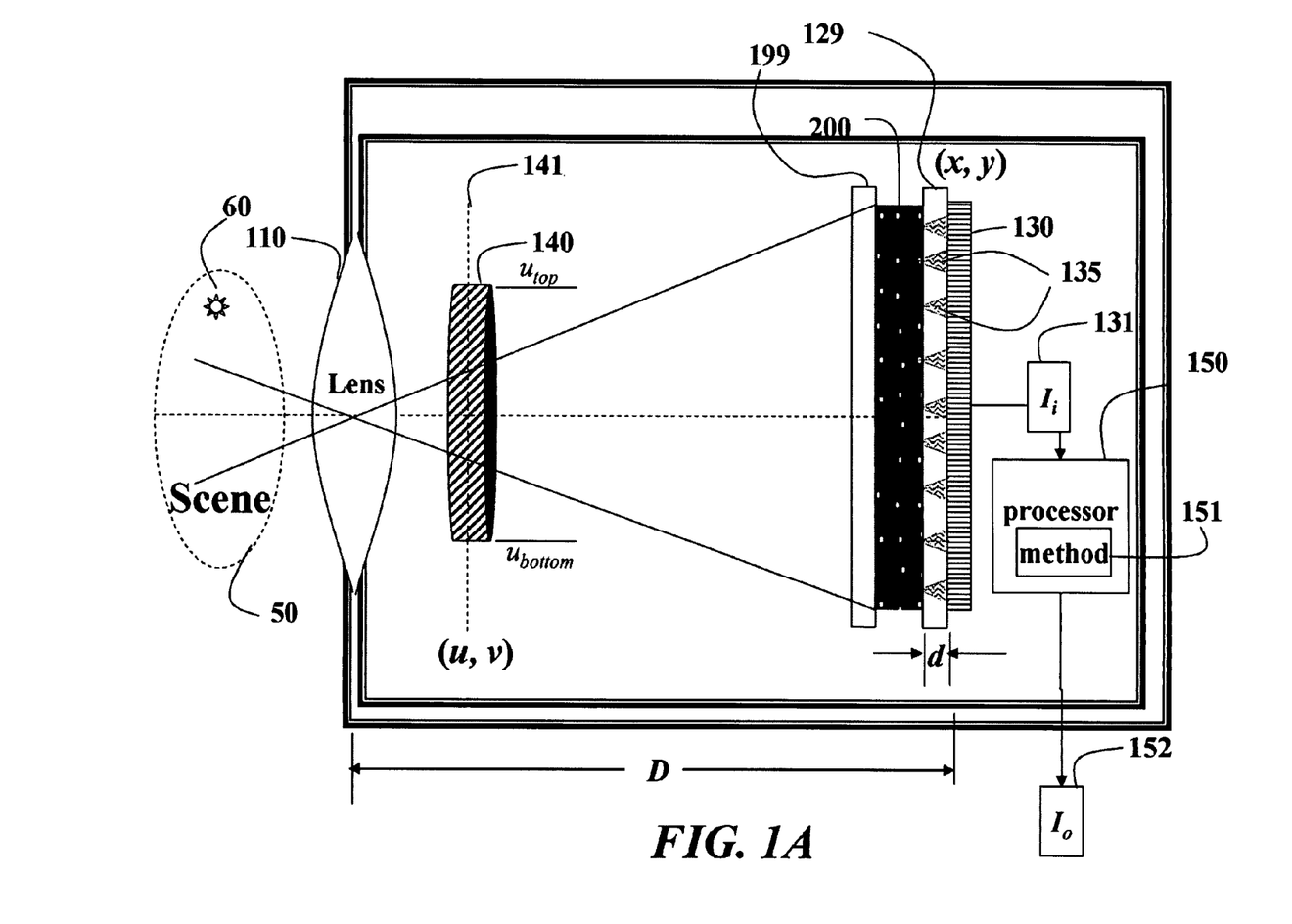
FIG. 1A is a block diagram of a camera for reducing glare in an image according to an embodiment of the invention.

FIG. 1A shows a camera 100 for reducing glare according to an embodiment of our invention. The camera acquires an input image 131 of a scene 50 including a bright light source 60. The camera includes a lens 110, a high-frequency mask 200, and a sensor 130 having sensor pixels. The mask is placed at a distance of about 1.2 mm from the sensor and coplanar with the sensor. The camera can also include an aperture 140. The sensor is coupled to a processor 150, which processes the input image $I_i$ 131 acquired by the sensor using our method 151. An output image $I_o$ 152 has reduced glare.

Figure 1B:
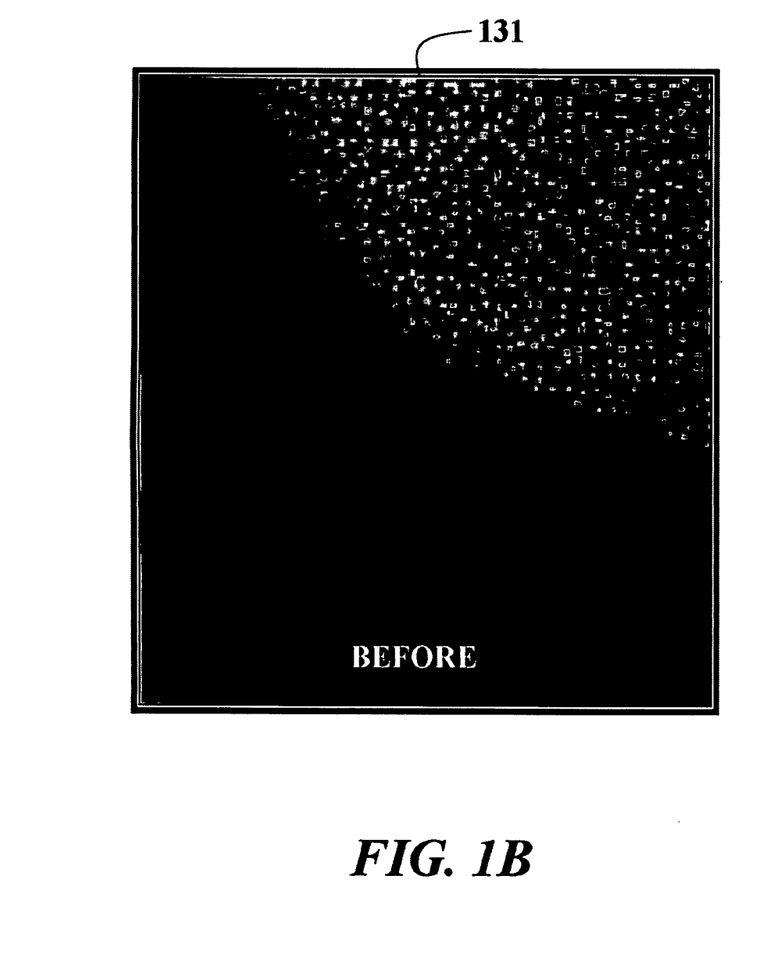
FIG. 1B is an input image with glare according to an embodiment of the invention.
Figure 1C:
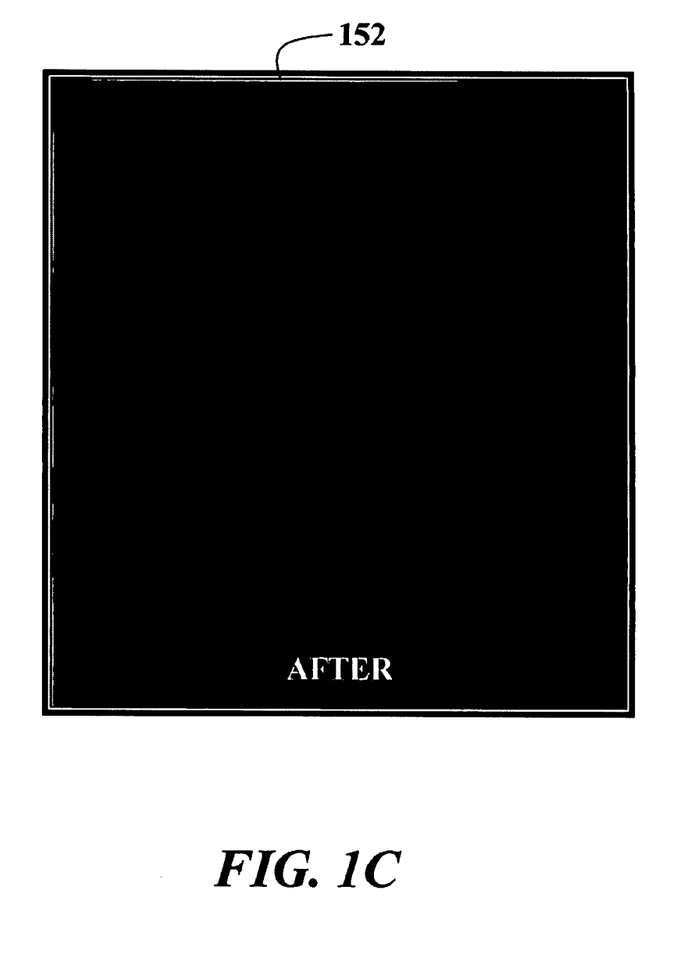
FIG. 1C is an output image with reduced glare according to an embodiment of the invention.

FIGS. 1B and 1C dramatically shows the before and after effects of our invention. As shown in FIG. 1B, the glare is evident as isolated bright pixels due to our mask with randomly placed pin-holes. The glare pixels have clearly been separated from the rest of the image. These pixels can now be easily be identified as being 'outliers' using some thresholding technique, and replaced using a filtering technique as shown in FIG. 1C.

We modify a conventional medium format digital camera with a 22 mega-pixel sensor 130, and digital back. The 36 mm×48 mm sensor has a resolution of 5344×4008 pixels with 8.9μ pitch, and 12-bits per color channel. A 1.2 mm thick glass plate 129 protects the sensor. We construct the pin-hole mask 200 to be the same size as the sensor. We place the mask next to the sensor protective glass plate. We used an additional glass plate 199 to flatten the mask and hold it in place. Our pin-hole array f-stop (f/#) is f/8. We use 50 mm and 80 mm fixed focal length D lenses with f/8, and f/5.6 aperture stop settings. We could reduce the pin-hole spacing by a factor of 2.6 as described below. However, we reduce the pin-hole spacing only by a factor of $\sqrt{2}$ by increasing the aperture to f/15.6. The pin-holes disperse 135 the lightfield.

Mask

Figure 2:
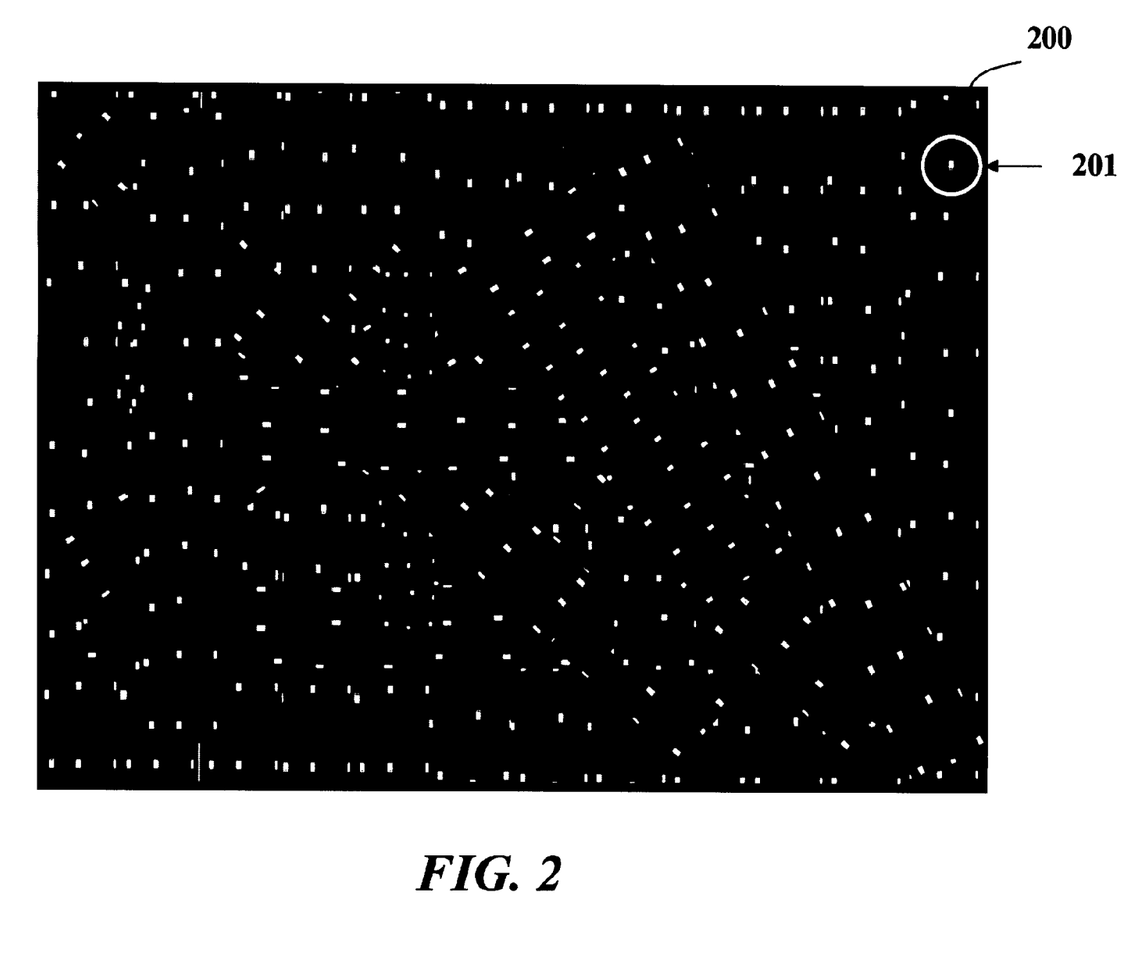
FIG. 2 is a schematic of a pin-hole mask according to an embodiment of the invention.

As shown in FIG. 2, the high-frequency mask 200 includes randomly arranged pin-holes 201, although other patterns, e.g., regularly spaced, are also possible. The masks act as a 'sieve' that disperses and separates spurious light rays in ray-space to reduce the glare. For the randomized mask, we used a uniform distribution for randomized inter-pin-hole distance with a mean M and a range of two pixels. We print the mask on a very thin sheet of film using valve technology (LVT) at a resolution of 25 microns. The size of the pin-holes is about 25 microns. The size of each pin-hole matches a size of each pixel of the sensor for optimal 4D ray-space sampling.

Figure 3:
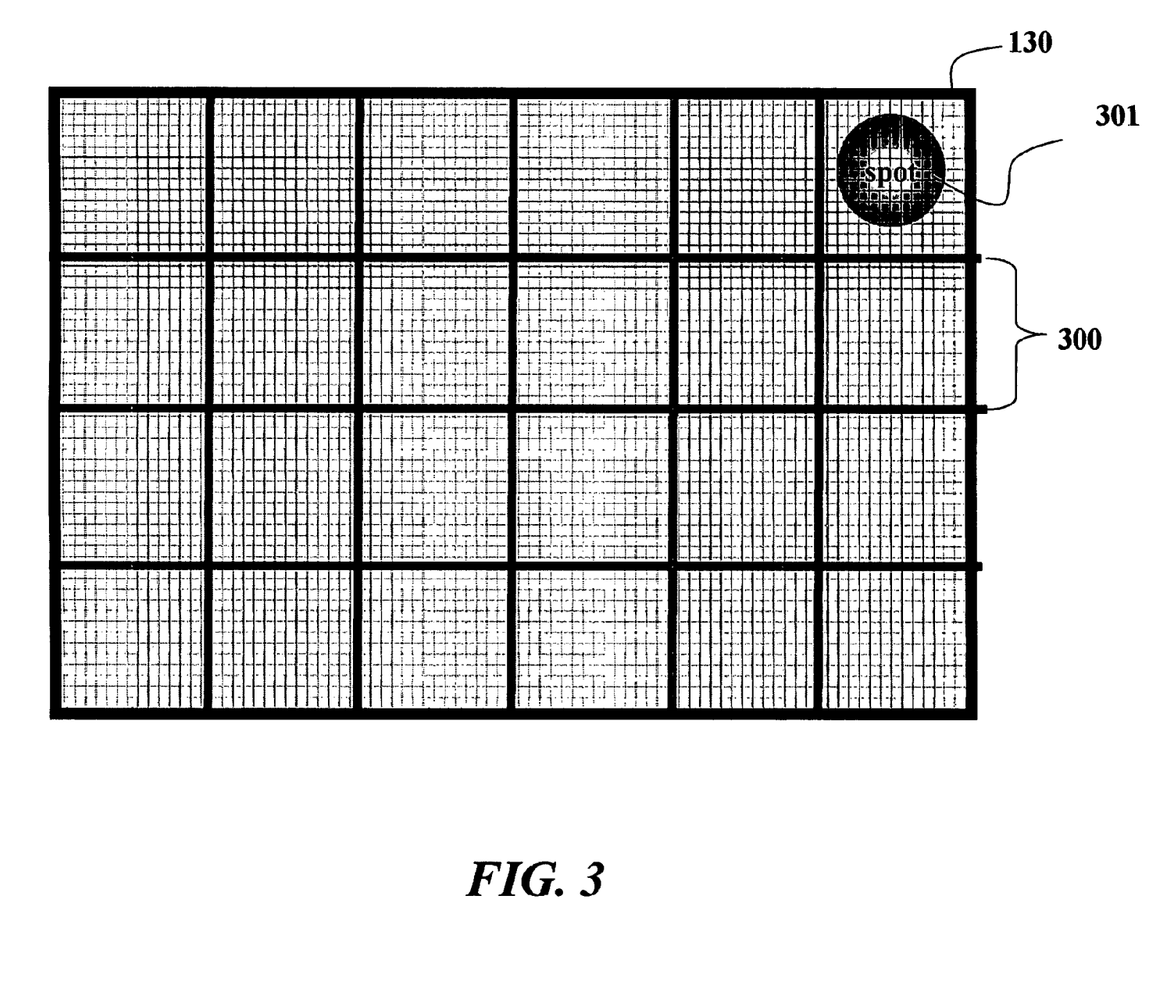
FIG. 3 is a schematic of a sensor partitioned into tiles, and a circular spot illuminated via a pin-hole according to an embodiment of the invention.

As shown in FIG. 3, not to scale, we can partition the pixels of the sensor 130 into tiles 300, for a regularly spaced pin-hole pattern. Each tile of pixels is 180 microns on a side. We have 265×198 macro-pixel tiles, and 180/8.9=21 angular sub-aperture pixels per tile, well above a minimum of 7×7 tile size. Each pin-hole illuminates a corresponding random circular spot 301 on the tiles. For a random pin-hole pattern, we can use a 'sliding' window of tiles that is scanned over the image one pixel at the time, in a manner that many image filtering operations are performed. At each pixel position, outliers are identified and filtered.

4D Light Fields

The effect of glare can be described using terminology of a conventional 4D light field camera. A light field camera records the spatial and angular variations of light rays incident at the pixels of the sensor. For an unoccluded Lambertian scene patch in sharp focus, the incoming rays have no angular variations.

Reflection glare causes a bright light source in the scene to make a stray contribution to the outlier pixels of the sensor, but only along a specific angular direction. We replace the intensities of the outlier pixels in the angular dimension and the impact on the recorded luminance of a scene patch. The outliers appear as high frequency noise in 4D, although the projection of 4D ray-space onto the 2D sensor causes an apparent low-frequency glare.

Conventional methods use a 2D deconvolution approach to reduce glare in 2D post-processing. However, deconvolution usually fails due to limited quantization where glare overwhelms the signal. Our outlier replacement can handle reflection glare as well as several types of scattering glare.

We sample the 4D ray-space as in a conventional light-field camera. In some cases, we can ignore the spatial arrangement of the sub-aperture views recorded on the sensor, to replace outliers due to glare. In other cases, we exploit coherence in adjacent sub-aperture views for clustering the spurious rays due to glare in 4D. To the best of our knowledge, our method is the first attempt to acquire and analyze glare in the 4D ray-space.

We provide techniques to analyze glare by acquiring a slice of the 4D light field, while minimizing resolution reduction. Our goal is not to acquire the 4D light field, but instead to reduce glare and reconstructed the output image in 2D.

Specifically, we describe glare as a higher dimensional phenomenon. We clarify how glare manifests as a low frequency contrast reduction in images. We provide a method to decompose a glare spread function into reflection (outliers), scattering (bias), and camera body and non-glare components. We provide a practical method to acquire and reduce glare in a single shot image using a portable handheld camera. We provide a method for minimizing loss of resolution in the output 2D image, while reducing glare.

Our camera and method reduce and manipulate glare in a variety of applications. We can process images acquired while the lens is directly exposed to the sun, and images without a hood around the lens. We can remove the effect of material on the lens, e.g., dust, water droplets, smudges, and reduces loss of contrast due to camera body reflections.

Unlike conventional 4D light field acquisition methods, we can recover full resolution information for in-focus parts of the image. In addition, our method is ideally suited for single-exposure acquisition of scenes with an extremely high dynamic range (H)R. Even without multi-exposure HDR imaging, we can ensure that saturating glare does not overwhelm the signal received from the scene.

Sources of Glare and Flare: Reflection Versus Scattering

We describe the sources of glare in 4D ray-space, and explain their impact in image space. Reflection glare appears as parasitic images when the sun or another strong light source causes a complex series of reflections among the lens and body surfaces of the camera. Ghosts appear as clearly defined aperture-shaped reflections in a position symmetrically opposite the bright light source. Flare appears as more uniform fogging of a large image area. Flare is most noticeable for large aperture, wider field of view, shorter wavelength and near the center of the image.

The definition and distinction between ghost and flare varies. Fresnel reflection is the portion of incident light reflected at a discrete interface between two media having different refractive indices. In a general glass-air interface, roughly 4% of the light is reflected. For a lens with n surfaces, i.e., a glass air interfaces due to n/2 lens elements, the number of parasitic ghost images is $n(n-1)/2$.

Glare is additionally increased by lens filters, because the filters have flat profiles perpendicular to the optical axis. Reducing aperture size does not necessarily reduce glare because the aperture can in fact contribute to reflections, e.g., an aperture surface made of a mirror or some diffuse reflector. Scattering glare is caused by diffusion at the lenses. The optical elements act as diffusers. However, the diffusion angular profile is very narrow and scattering glare falls off very quickly away from the image of a light source.

Because reflection glare and scattering glare overlap in an image, they are difficult to automatically identify, classify, and remove. Reflection glare contributes to pixels in much more complex ways than plainly visible aperture-shaped ghosts. In an image of a bright light source, the low frequency glare includes overlapping defocused aperture ghosts. Away from a correct light source image, the lower intensity fog has significant contribution from reflection glare.

Glare is difficult to distinguish in 2D. However, we believe that the distinction between the desired image and the two types of glare is clearer in 4D. Therefore, the mask 200 between the lens 110 and the sensor 130 in our camera 100 makes the glare separable.

Basic Concepts

A conventional 2D glare point spread function (GPSF) describes the intensity of the glare caused by a point light source, as a function of the distance from the center of its image. However, that characterization is too restrictive. Rays from the point light source reaching all parts of the lens are assumed to have equal radiance. The GPSF also combines multiple glare effects.

We redefine glare using 4D rays, rather than 2D pixels. Glare is a result of the mapping of a given light ray to one or more stray rays due to camera optics. We define a glare ray spread function (GRSF) G as a 4D function that describes how much radiance from a single incident ray transfers to every other ray.

For example, if a narrow beam of light is aimed at the lens, then the 4D light field acquired at the sensor shows the contribution of the corresponding ray in the spatial and angular dimensions. If we aim the beam at a slightly different part of the lens without changing its location, then we obtain a new GRSF. Based on this GRSF, we redefine both types of glare.

Reflection: A discrete mapping of a ray to multiple distinct non-adjacent rays can be treated as high frequency convolution of incident rays in 4D ray-space.

Scattering: A mapping of a ray to multiple adjacent rays due to diffusion is a low frequency convolution in 4D ray-space.

A two-plane parametrization of the incident light field is $L(u, v, x, y)$, where $(u, v)$ denotes the plane of the aperture 140, and $(x, y)$ denotes the plane of the sensor 130. We assume a simplified thin-lens representation for the main lens. In case of reflection glare, an incident ray with coordinates $(u_0, v_0, x_0, y_0)$ maps to non-adjacent rays. In the case of scattering glare, the lens acts as a diffuser. The incident ray maps to a cone of rays traveling from the same lens position $(u_0, v_0)$ but projects on adjacent pixels $\epsilon$, given by $$(u_0, v_0, x_0 \pm \epsilon, y_0 \pm \epsilon)$$

The complete GRSF G is composed of two functions. The reflection-GRSF, R, and the scattering-GRSF, S. Both functions convolve the original light field $L_0$ outside the camera to produce a distorted light field L inside the camera as $$L = L_0 + (L_0 * (R+S)). \qquad (1)$$

The modified 4D light field is converted into a 2D image via integration over an angular dimension at the sensor. In practice, the ray spread functions R and S are spatially varying, and hence, denote an 8D function.

Higher Dimensional Effects of Glare

The glare spread in higher dimensional ray-space impacts the 2D image intensities after angular integration on the sensor. For simplicity of this description, we use a 1D sensor and a 2D light field $L(u, x)$, where $(u)$ are the aperture coordinates, which extend from $u_{top}$ to $u_{bottom}$. The sensor pixel coordinates are x. A point light source is in sharp focus at sensor pixel i, and hence all entries of $L(\bullet, i)$ are equal. Due to the reflection glare, the point light source maps to a range of rays. The set of rays focused at pixel i causes scattering glare spreading in x-direction. The rays can also bounce off the camera body and fall outside the $[u_{top}, u_{bottom}]$ range.

The integration of the 2D light field onto the 1D sensor is represented as a 1D projection onto the x-axis. The luminance values add up sharply at pixel i, but the values also contribute to glare. High frequency reflection glare in ray-space emerges as a low frequency profile in the 1D image space. The scattering glare is large near the pixel i but drops off rapidly. A nearby pixel j is simply overwhelmed by the remaining reflection glare, and it is difficult to distinguish between the contribution of the reflection or the scattering glare.

If we have the 2D light field representation, then we can remove the effect of reflection and possibly camera body glare. Instead of computing a full higher dimensional light field representation, we analyze a subset of the light field to decompose the glare into components.

Comparison with Other Active Approaches:

Our work is motivated by Talvala et al, "Veiling glare in high dynamic range imaging," ACM Trans. Graph. 26,3 37:1-37:9, July 2007. They use a large structured occlusion mask, similar to a grating between the scene and camera, and closer to the scene. Our pin-hole mask is between the lens and the sensor, and closer to the sensor. They acquire a large number of HDR images, we acquire only one image. Their setup makes it difficult to image distant scenes, or outdoor natural scenes. They assume that the glare is low frequency due to environment sources. This is not always the case in practice. Therefore, point and small area sources that cause sharp lens flare cannot by handled by their masks.

Particularly, they cannot handle glare produced inside the camera body. We can. Our method is tolerant of pixel saturation due to glare, and hence, can work without multi-exposure HDR imaging. We do not require geometric calibration in the scene for different focus settings, and it is not necessary to decrease the aperture to increase the depth of field.

While acquiring images we can change the focus setting of the lens to any desired depth. In contrast, Talvala et al. require the external mask to be in focus and close to the scene at the same time. In their method (a) focusing at a different depth requires moving the mask (a physical modification to the scene itself) and (b) since the mask must be placed between the scene and the camera, no part of the scene can be closer to the camera than the focus plane, which is a severe restriction.

Reducing Glare

Figure 4:
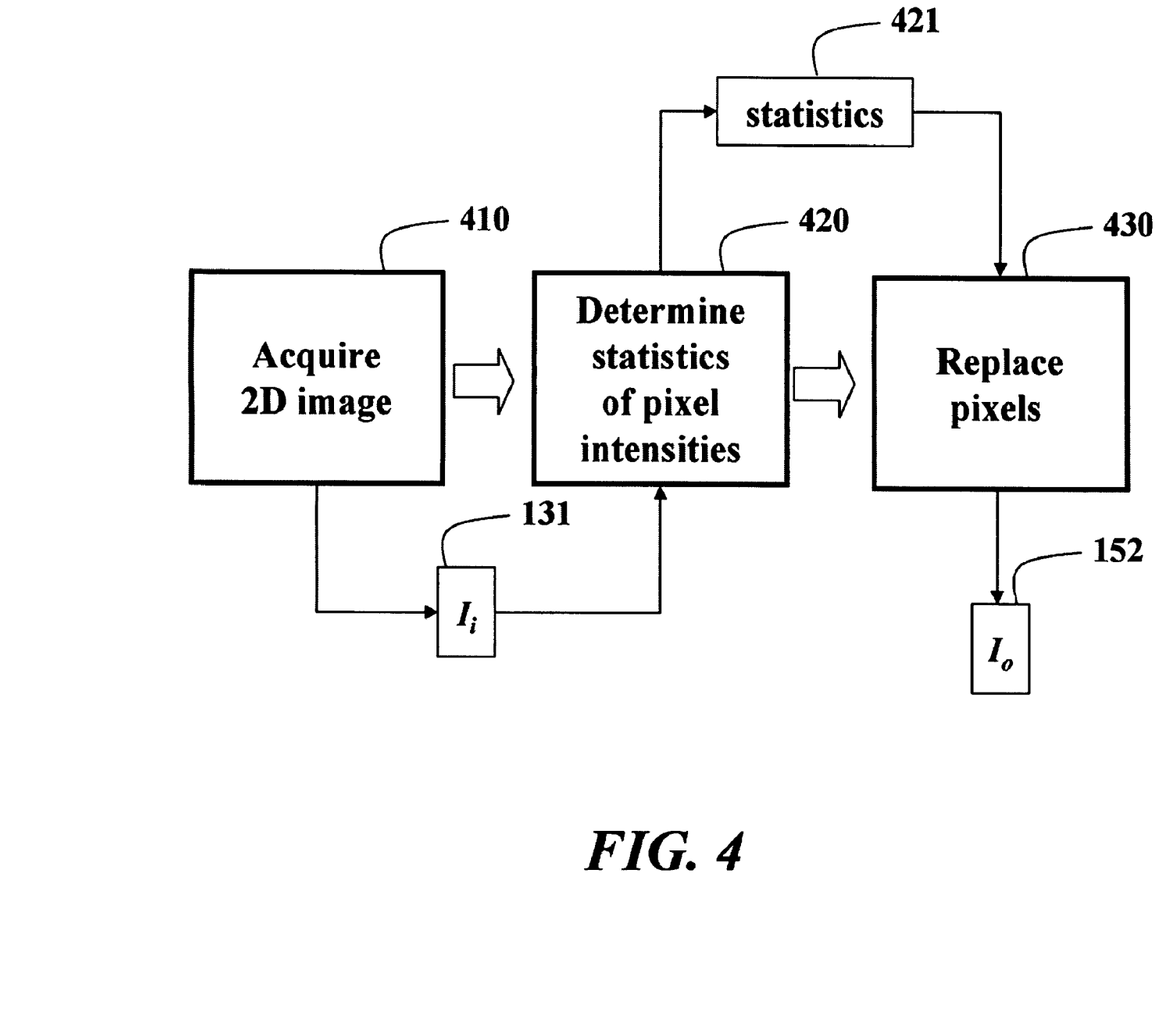
FIG. 4 is a flow diagram of a method for reducing glare according to an embodiment of the invention.

As shown in FIG. 4 for one embodiment of the invention, we acquire 410 the input image Ii 131 with our camera 100. We determine 420 statistics 421 for each pixel in the input image. Then, for each pixel (x, y) in the input image, we replace 330 pixels according to the statistics. The statistics can be mean or median of the intensity values of adjacent pixels, e.g., the pixels in the corresponding tile. Essentially, we apply a median filter to the entire input image to obtain the output image.

Figure 5:
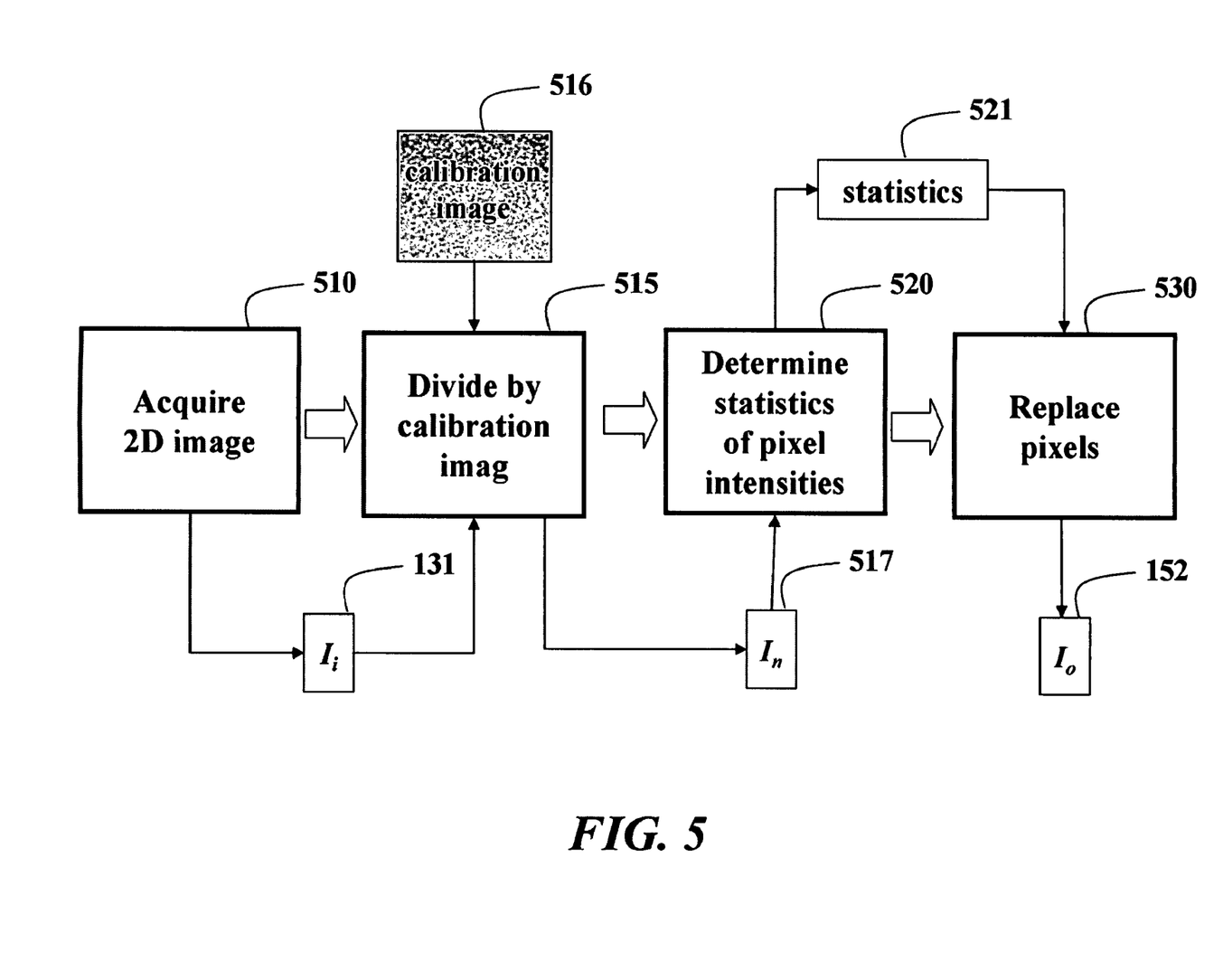
FIG. 5 is a flow diagram of a method for reducing glare according to another embodiment of the invention.

As shown in FIG. 5 for another embodiment, we acquire 520 our input image 131 as before. We divide 515 the input image, pixel by pixel, by a calibration image 516 to obtain a normalized image 517. We apply a tile-sized moving window to each pixel in the normalized image, and determine 520 the median for all pixels in the tile. If the pixel intensity value is greater than the median intensity value of the adjacent pixels (in the tile) by a predetermined threshold T, we replace 530 the pixel by interpolating linearly from the adjacent pixels in the image.

Design Choices

Light field camera designs must find acceptable compromises between the following.

Saturation: In a conventional lenslet based camera design, ignoring blooming, saturation of one pixel does not impact adjacent pixels. Sum-of-cosines mask-based methods sample linear combination of rays, and hence, assume a linear response. Under and over exposure makes the linear inversion and decoding unstable. In addition, the decoding process amplifies noise.

Diffraction: The additional diffraction blur introduced by lenslets or pin-hole masks placed outside the camera can interfere with the ability to use statistics.

Additional glare: Lenslets and masks can also introduce additional glare due to inter-reflections between the sensor and lenslet or mask.

Resolution: Lenslets, as well as sum-of-cosine masks, place limits on maximum recoverable spatial frequency. Our pin-hole mask provides some flexibility as described below.

4D Partitioning

Our idea is to use an acquisition method so that a high frequency pattern in the 4D light field appears as a high frequency pattern in the acquired 2D input image 131. We sample the 4D ray-space using the pin-hole array mask 200 because it prevents the saturation and resolution issues described above. We prefer a random arrangement of the pin-holes, which has pleasing results.

For simplicity, we use conventional light field camera terminology. We discretize the light field into a finite number of 'sub-aperture' pixels denoted by the aperture coordinates (u, v) and a finite number of sensor pixels (x, y). The union of the rays passing through a given sub-aperture and contributing to a single sensor pixel as one is 'ray' of our system.

As shown in FIG. 3, we define a tile 300 of pixels approximately centered under each pin-hole. The tiles are also uniform for uniform grid of pin-holes. The notion of a tile remains the same for the randomized pin-hole mask, where the pattern of the tiles is not uniform.

The f/# (f-stop) for the pin-hole is the tile size divided by the mask-to-sensor distance d, see FIG. 1. The image under each pin-hole is an aperture-shaped circular 'spot' 301 which varies with the f/# of the lens. When the f/# for the lens and the f/# for pin-hole match, the spot inscribes our tile of pixels.

We provide a sub-views corresponding to the image generated by a sub-aperture. In our case, the scene of interest is in focus and conjugate to the sensor. Without the mask, a bright point source causes a low frequency bias over the entire sensor. With our mask, the reflection glare contributes to only a few localized pixels. The opaque part of the mask blocks several rays.

Because the pin-hole array mask is at a small distance d from the sensor, the corresponding pixel replacement takes place at a very small angle with respect to the vertical axis. The angle is $d\pi/(2D)$ radians where D is the distance between the aperture and the sensor. Many rays corresponding to glare never reach the sensor. For the in-focus parts, at least one ray reaches the image sensor at the appropriate position.

The flare cause by a point light source contributes to a large area of the sensor. But the flare contributes only along a specific direction for a given pixel. Hence, pixel j which was overwhelmed by reflection glare is now unbiased by glare. The reflection glare instead appears as an isolated contribution elsewhere within the spot formed below the pin-hole.

The key parameters are:
mask to sensor distance d, given the aperture f/#,
pattern of the pin-holes, and
size of the pin-hole.

The size of the pin-hole is selected to avoid diffraction blur on the sensor. The distance d affects the overlap, or lack thereof, between spot images formed by each pin-hole. The diameter of the spot 301 is $k=d/(f/\#)$. If the sensor has m×m pixels, then we can have at most m/k evenly placed pin-holes. However, we can perform outlier removal, even with significant overlap between the spots.

If the distance d between sensor and mask is increased, the angle increases, and the spot spans more pixels, effectively increasing the number of angular observations. In general, the pixel resolution of the camera is fixed and therefore the product of the number of pin-holes and the number of pixels in each tile is fixed.

Differences with Respect to a Conventional 4D Light Field Camera

Our camera does not need to reversibly encode the projection of 4D ray-space onto the 2D sensor. Hence, our camera differs significantly in terms of its imaging resolution and design philosophy from conventional cameras.

Resolution Recovery

In the conventional lenslet-base light field camera, the scene is conjugate to the lenslet array. In contrast, we keep the scene in sharp focus at the sensor as demanded for clear photography. We acquire a full resolution image for the in-focus parts of the scene. Conventional light field cameras either lose resolution or run into frequency-domain reconstruction issues.

Each pixel in the tile receives a contribution from a small and different part of the (u, v) aperture plane. Hence, every neighboring scene point is acquired by a slightly different center of projection. If the scene point is in focus, then introducing the mask blocks some of the rays without changing the pixel position. As long as at least a part of any sub-aperture contributes rays to this pixel, we can measure its intensity. If this is true for all the pixels, then we can acquire a full resolution image for all parts of the scene that are in focus. With a mask-less sensor, out of focus points cause a circle of confusion where the contribution from each sub-aperture is displaced within the circle. In optics, the circle of confusion is an optical spot caused by a cone of light rays from a lens not coming to a perfect focus at the sensor.

At one extreme, when the region is in sharp focus at the mask, the circle is tile-sized on the sensor. If a focused image is collocated with a pin-hole, then we record the full circle of confusion. If the focused image forms elsewhere on the mask, then all rays are blocked by the mask. This means, we point sample the scene plane at a reduced spatial resolution. However, the maximal spatial frequency is the same as a mask-less sensor. Because, every neighboring scene point is acquired by a slightly different center of projection, the out of focus portions show a stair-step like effect.

Design

We are less concerned about the layout of the sub-aperture views in the 2D image. In conventional light field cameras, the lenslet or masks must be carefully aligned with respect to the sensor. In-plane rotation causes moire patterns and varying separation between the lenslet or mask, and the sensor causes blurring and 4D sampling issues.

The reduced constraints for our camera and method simplify our design and reduce precision requirements. Most important, our approach provides a novel functionality beyond the most common geometric applications like digital refocusing, view interpolation or shape recovery.

Glare Decomposition

The observed glare patterns have useful statistical properties with or without even spacing between the pin-holes. Reflection glare appears at bright outlier pixels, and scatter glare appears as a bias, reducing contrast. For a smaller f/#, body glare appears outside the spot but inside the tile. Reflection glare is caused by stray rays and can be reduced using outlier analysis. Scattering glare adds a bias which is not easy to reduce. Camera body glare formed by scattering of rays after the last lens element appears outside the spot and can be reduced. But camera body glare due to a lens barrel behaves like scatter glare, and cannot be easily reduced.

Our technique works well in the presence of saturation. In a conventional camera, glare contributes to all the pixels in a neighborhood potentially saturating or biasing all of the pixels. In our camera, glare contributes to a few pixels in a tile. If those pixels are saturated, then their intensity is 'clamped' at the maximum without affecting the adjacent pixels.

Even before outlier replacement, we can simple average values in a tile using to generate a lower resolution output image with reduced glare due averaging of a few saturated outlier pixel and several correct inlier pixels. By using a non-linear response camera, such as a logarithmic sensing camera, we can achieve even better noise and quantization behavior despite saturating glare.

2D Image Analysis

For a more reliable lower resolution result, we use simple operators to estimate components. We determine max(tile) and min(tile) as the maximal and minimal intensity values of a tile and exploit the relationships:

max(tile)=glare+signal, min(tile)=signal, and glare=max(tile)−min(tile).

We use the average of the top and bottom 20% of the values to estimate max(tile) and min(tile). This strategy works well when the glare outliers are well below 50%. The benefit of 2D analysis is that we are not concerned with a well-specified mapping of 4D ray-space to the 2D image.

4D Analysis

The glare rays have a high coherence in 4D ray-space. We exploit the coherence to overcome limitations of 2D analysis. The 2D processing fails when a single tile contains multiple outlier elements covering more than 50% of the tile. Flare and ghosts have a characteristic structure in 4D because they are caused by highly symmetric elements of optics. In addition, the reflection glare causes a virtual image of bright lights inside the lens. In an epipolar plane image (EPI), a horizontal scan line is determined from the sub-aperture views from the light field. Each row i of the EPI correspond to $L(u_i, v_j, x_i, y_j)$ for fixed $y_j$ and $v_j$, and is the view from a successively displaced pin-hole at $u_i$, $v_j$ in the aperture plane.

For glare-free pixels in focus, all the rays corresponding to $L(\bullet, v_j, \bullet, y_j)$, or the vertical lines in the EPI have the same intensity values. The glare contribution of a bright light source causes slanted lines in the EPI. The slanted lines indicate that the coordinate of glare contribution varies smoothly over neighboring views. We can exploit this spatio-angular coherence of glare in neighboring tiles for improved glare reduction.

We perform a 4D segmentation, via a 2-way clustering to segment the 4D ray-space into a glare and non-glare parts as follows. In this method, it is necessary to know the locations of the pin-holes. Therefore a regularly spaced pattern is used.

Figure 6:
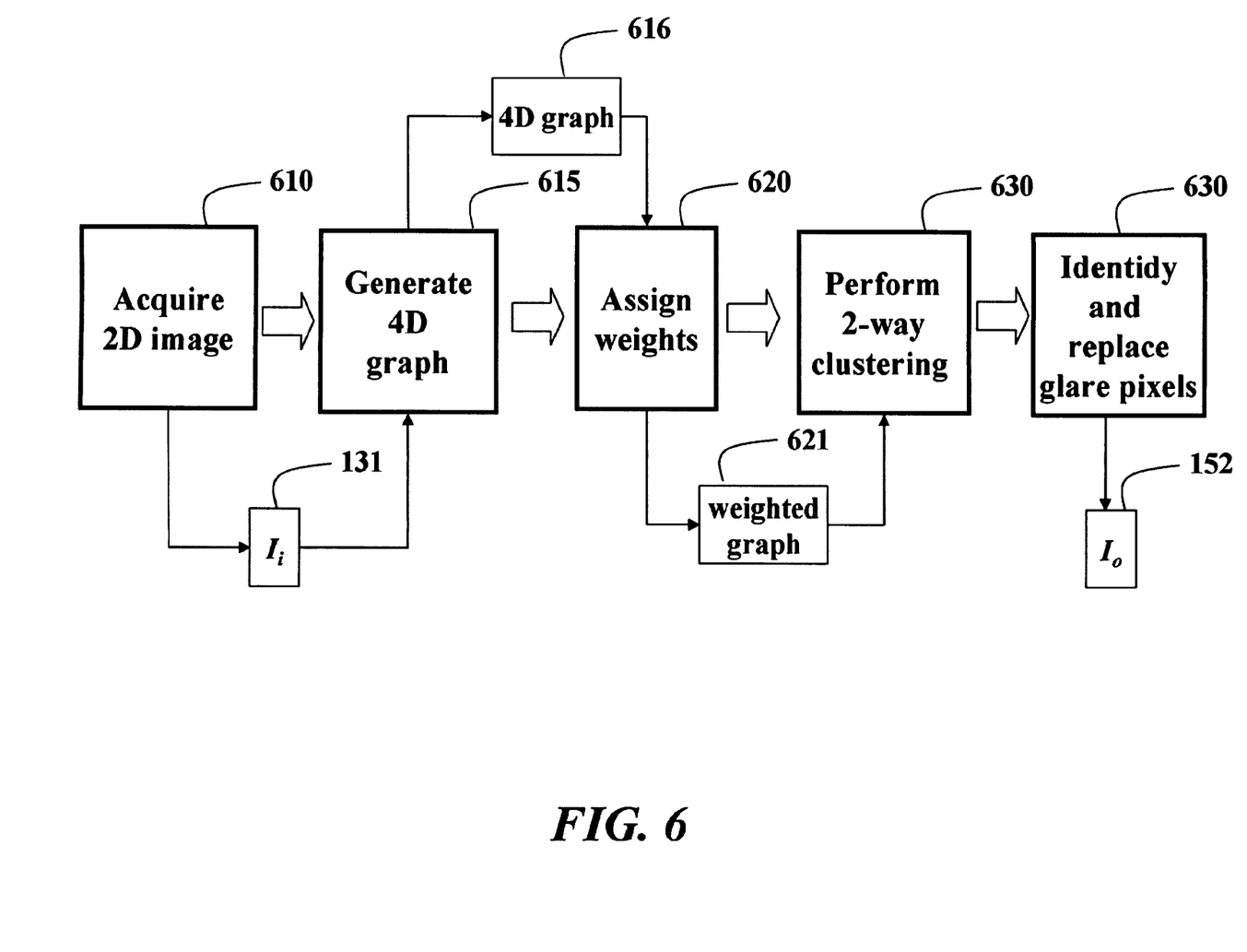
FIG. 6 is a flow diagram of a method for reducing glare according to another embodiment of the invention.

(i) We acquire 610 the input image.
(ii) We generate 615 a 4D graph 616 from the 4D light field. The nodes of the graph correspond to the light field samples $L(x, y, z, v)$. Each node is connected according to a 4-neighborhood, i.e., $3^4-1=80$ spatial and angular neighbors.
(iii) We assign 620 weights to the edges connecting the nodes. The weigh W of the edge between nodes $L(x_{i1}, y_{j1}, u_{m1}, v_{n1})$ and $L(x_{i2}, y_{j2}, u_{m2}, v_{n2})$ is
(iv) $W=\exp(-L(x_{i1}, y_{j1}, u_{m1}, v_{n1})-L(x_{i2},y_{i2}, u_{m2}, v_{n2}))^2/2\sigma^2$, where $\sigma$ is a constant, to obtain a weighted graph 621.
(v) We perform 630 two-way clustering with a small bright pixels as the "source" and perform a maxflow or mincut process to identify the light field samples (pixels) corresponding to the glare. The maxflow mincut process is derived from the well known Menger's theorem. The maximum amount of flow in a graph is equal to a capacity of a minimal cut.
(vi) We identify 640 the glare pixels, and for each identified pixel (x, y), we select a sub-view which maximizes a spatial contrast within a 3×3 neighborhood of the identified pixels to obtain the output image 152.

In contrast with conventional digital refocusing techniques based on 4D light fields, we do not select a virtual plane that maximizes the spatial contrast. In fact, values within a tile are likely to be quite different because we are sensing the image at full resolution. Instead, we use statistical properties and the coherence of glare contribution in terms of color and coordinates (u, v) in the aperture plane.

Reducing Scattering Glare

Reflection glare depends highly on the position of the light source. Modeling the glare as a 2D point spread function is difficult. Thus, convolution based techniques fail in presence of strong reflection glare. However, after removing the outliers corresponding to the reflection glare, the remaining low frequency scattering glare behaves in a more predictable way. We model the scatter glare PSF as a combination of Gaussian functions in 2D, and deconvolve the reflection glare reduced output to decrease the scattering glare.

Applications

We describe several examples of contrast enhancement including outdoor scenes, strong aperture ghosts, and multiple lights in the scene.

Contrast Enhancement

An outdoor sunlit scene spans a wide dynamic range. Parts of the scene, such as the sun and the sky are saturated. The sky is also very bright. So this case involves a relatively extended area light source. In this case, the majority of glare is reflection glare, and the portion of the 2D image that appears to be washed out is also caused by reflection glare rather than scattering glare. However, the visible aperture rings overlap so that several tiles have more than 50% glare values.

Lens Smudges

Dust specks, fingerprints and water droplets on lenses or filters introduce unwanted diffusion and/or refraction. This causes a dramatic but localized reduction in contrast, appearing as a low frequency smudge. If the distorting element is limited to a narrow area of the lens or filter, then we can eliminate its effect via a 4D ray-space analysis. There are no bright lights sources or saturation, in this case.

If we replace the distorting element by an opaque black surface and have a finite aperture, then blocking a part of the lens nullifies certain rays making the image dimmer, but otherwise almost identical. We eliminate those rays so that we can remove the artifact and recover an image that is slightly dimmer. This elimination is a blind estimation problem because we do not have information to model the distorting element. We again use intensity statistics in the images.

First, we assume that the distorting element on the lens is highly out of focus while the scene is in sharp focus. Second, we assume that the color of the rays emitted from the distorting element have a strong spatio-temporal coherency. Both these assumptions are valid in almost all cases. We determine the views $\{L(u, v, \ldots, \ldots)\}$ and reconstruct the output image by moving a virtual plane. By using a simple contrast maximizing operator, we select only those pixels from views that maintain the highest spatial contrast.

Camera Body Glare

Camera body glare is caused by reflections from the space between the last lens element and the sensor. Rays from objects outside the field of view and rays blocked by the anti-reflective coating or aperture eventually end up on the camera body. High-end cameras use baffles to prevent their impact. In contrast with the prior art, we can reduce inside the camera body glare.

Our method is also applicable to more ad hoc imaging arrangements where it maybe difficult to cause high quality baffles to attenuate stray light. By giving up a small percentage of resolution, the stray light can be blocked outside the spot.

Rendering and Synthesis

Photographers intentionally use glare for artistic effects and to cause an illusion of bright light sources. Glare is rendered via software image filters or ray-tracing to generate visually compelling flare effects. However, those methods do not have much control over the glare formation. In addition, glare is difficult to examine through optical or digital viewfinder.

We use the decomposed glare components in several interesting and physically realistic ways for digital glare manipulation. For example, the replaced outlier component, i.e., maximum-minimum in a tile, provides an estimate of reflection glare.

Mask Pattern

To ensure we can remove glare rays as outliers, we can analyze the optimal pin-hole spacing and number of pixels in a tile. The number of pixels in a tile is M, and the number of pin-holes per tile is N. Consider the simplest design where N=1, and each pin-hole contributes one ray to the sensor and each sensor pixel receives N=1 rays.

Let us assume that each scene ray having a radiance that is independently affected by the glare radiance b, and on average radiance a is the fraction of glare affected rays.

Analytical Model for Pin-Hole Spacing

The probability that out of the N rays reaching a single pixel, exactly r rays are affected by glare is, $$p(\text{number of glare rays}=r)=(_r^N)(\alpha)^r(1-\alpha)^{(N-r)}. \quad (2)$$

The intensity of the measured pixel (i) is obtained by averaging the radiance of the rays reaching the sensor. The intensity is $$i=(r(b+a)+(N-r)a)/N=r(b/N)+a.$$

Because this relationship is linear, the measured intensity has the form of a shifted Bernoulli distribution $$p(\text{measured intensity}=i)=(_{r_i}^N)(\alpha)^{r_i}(1-\alpha)^{(N_p-r_i)}, \quad (3)$$

where $r_i=(I-a)N_p/b$.

For the outlier detection process to work, we are conservative and restrict that at least a fraction $\beta=0.7$ of the measured pixels are not affected by glare. Therefore, $$p_B(\text{pixel not affected by glare})=p_B(r=0)=(1-\alpha)^{N_p} \geq \beta. \quad (4)$$

Assuming a nominal value of 0.05 for a, we obtain, $$(1-a)^{N_p} \geq \beta \Rightarrow N_p \leq 6.9.$$

Therefore, in 2D, we can reduce the pin-hole spacing by a factor of $\sqrt{6.9}=2.62$, thereby increasing the number of pin-holes by a factor of 6.9. In our implementations, we decreased the pin-hole spacing by a factor of $\sqrt{2}$, thereby increasing the number of pin-holes by a factor of 2. The details are described below.

Optimal Number of Pixels in a Tile

Using the above analysis, each pixel is affected by glare independently with a probability of $1-\beta$. The probability that r out of the M sensor pixels are not affected by glare is $$p_B=(_r^M)\beta^r(1-\beta)^{(M-r)}.$$

For outlier detection to work well, $r \geq M/2$. Thus, the probability that at least 50% of pixels are not affected by glare is $$f(M) = \sum_{r=M/2}^{r=M} \binom{M}{r} \beta^r (1-\beta)^{(M-r)}. \quad (5)$$

Figure 7:
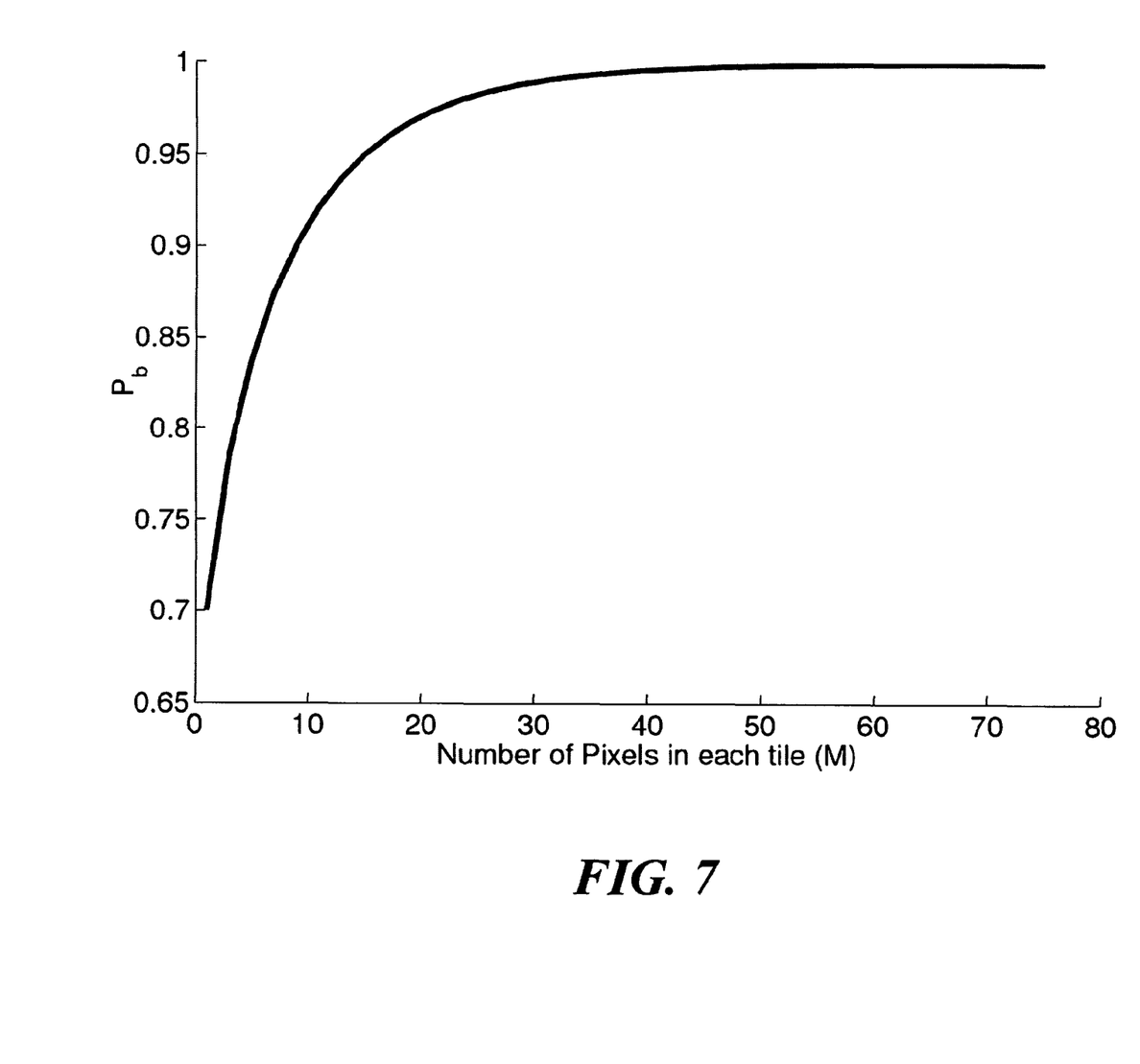
FIG. 7 is a graph of a probability of glare as a function of a number of pixels.

FIG. 7 shows the probability $p_b=f(M)$ as a function of M. For reasonable fidelity, i.e., a $\approx$0.98 probability of glare detection, we need at least 25-50 pixels within each tile. This requires a tile size of about 5×5 or 6×5, or 7×7×7 pixels for reasonable performance in glare detection. In one implementation, we use tile sizes w of up to 21×21 pixels, thereby ensuring accurate glare detection performance even in the presence of bright glare.

For a given lens with a fixed aperture size, fixing the tile size essentially determines the distance d between the mask 200 and the sensor 130. From similar triangles, we have $$\frac{a}{D-d} = \frac{wp}{d} \Rightarrow d = \frac{wpD}{a+wp}.$$

In our camera, w=21, p=8.9μ, D≈80 mm, a≈13 mm leading to a sensor mask distance d of about 1.2 mm.

Implementation

Our mask requires longer exposure times. However, the light efficiency can be improved by using a coded aperture or using a sum-of-cosines pattern.

Our glare analysis as a 4D phenomena enables a more accurate representation of 2D glare PSF based on glare ray spread function G. This can enable improved lens designs as well as physically valid filters for glare deconvolution and rendering. It can support analysis of camera body or lens barrel reflections. We can decompose glare components in a single light GPSF.

More general techniques enable us to decompose multiple light contributions from a single image. We use the 4D analysis for distortions inside a camera. A similar statistical approach can be used to minimizing lens aberrations and chromatic aberrations.

Other masks are also possible. A volumetric mask enables further control over accepting and removing a set of 4D samples. We can use high-contrast spatial light modulators, or LCDs to form dynamic masks. The masks have the same resolution as the pixels, so Bayer mosaics used for color filtering could be combined with 4D sampling.

EFFECT OF THE INVENTION

The invention exploits statistical properties of 4D rayspace distortion inside a camera. The camera can reduce glare in a single image. It works with minimal changes to the camera, is portable and produces results in many practical challenging scenarios.

Glare-producing scenes inherently span a large dynamic range. Even with unavoidable saturation, our method works in a single shot without a need for multi-exposure HDR image acquisition.

Appearance of high frequency 4D glare as a low frequency 2D image pattern has conventionally confounded glare analysis. We have studied the phenomenon in ray-space allowing us to classify, visualize and, possibly for the first time, decompose glare into meaningful sub-components.

Glare is a common problem in several other fields, such as x-ray based tomography, lithography, antennas design for radio frequencies, fluorescent microscopy and in astronomy for isolating dim light sources appearing near bright stars. In majority of the prior art applications, the noise is removed by deconvolution. In contrast, the invention exploits higher dimensional sieving which enable new designs and support better recording sensors.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for reducing glare in an image acquired by a camera, comprising:
   acquiring an input image of a scene with a sensor with a camera, in which the camera includes a lens and a sensor having sensor pixels, and in which a mask including a plurality of pin-holes is place in close proximity to the sensor, and wherein a distance between the mask and the sensor depends on a spacing between the pin-holes; and
   filtering the input image to produce an output image with reduced glare.

2. The method of claim 1, in which pin-holes are arranged in a random pattern.

3. The method of claim 1, in which pin-hole are arranged in a regular pattern.

4. The method of claim 1, in which a size of the pin-hole matches a size of the pixels, and the distance is about 1.2 mm.

5. The method of claim 1, in which the glare is caused inside the camera.

6. The method of claim 1, in which the glare is due to material on the lens.

7. The method of claim 1, further comprising:
   defining the glare using a glare ray spread function (GRSF) G, in which a distorted light field inside the camera is $L=L_0+(L_0*(R+S))$, where $L_0$ is a light field outside the camera, R is a reflective-GRSF, S is a scattering GRSF.

8. The method of claim 7, further comprising:
   constructing a 4D graph from a light field L, in which each node is represented as a light field sample $L(x, y, u, v)$, and nodes are connected according to a 4-neighborhood, in which (x, y) are pixel coordinates, and (u, v) are coordinates at a plane of an aperture of the camera;
   assigning weights to the edges connecting the nodes, in which the weigh W of the edge between nodes $L(x_{i1}, y_{j1}, u_{m1}, v_{n1})$ and $L(x_{i2}, y_{j2}, u_{m2}, v_{n2})$ is
   $W=\exp(-L(x_{i1}, y_{j1}, u_{m1}, v_{n1})-L(x_{i2}, y_{j2}, u_{m2}, v_{n2}))^2/2\sigma^2$,
   where $\sigma$ is a constant, to obtain a weighted graph, and where i, j are pixel indices and m, n are aperture plane indices;
   performing two-way clustering on the weighted graph to identify the pixels corresponding to the glare; and
   maximizing a spatial contrast within a 3×3 neighborhood of the identified pixels to obtain the output image.

9. The method of claim 1, in which the filtering uses a mean filter.

10. The method of claim 1, in which the filtering uses a median filter.

11. The method of claim 1, in which the filtering is based on a statistical measure of intensities of the pixels.

12. The method of claim 1, further comprising:
    dividing the input image by a calibration image to obtain a normalized image;
    applying a tile-sized moving window to each pixel and adjacent pixels in the normalized image to determine a median for each pixel; and
    replacing an intensity of the pixel if the intensity is greater than the median by a predetermined threshold using interpolated intensities of the adjacent pixels.

13. The method of claim 12, in which a size of the tile a variable number of pixel.

14. The method of claim 1, in which the filtering assigns an average of adjacent pixels to each pixel.

15. The method of claim 1, in which the mask is volumetric.

16. The method of claim 1, in which the mask uses liquid crystal displays and is dynamic.

17. The method of claim 1, in which a size of the pin-hole is larger than a size of the pixels.

18. A camera for reducing glare in an image, comprising:
    a lens;
    a sensor;
    a mask including a plurality of pin-holes in close proximity to the sensor, and wherein a distance between the mask and the sensor depends on a spacing between the pin-holes; and
    means for filtering an input acquired by the sensor to produce an output image with reduced glare.

19. The apparatus of claim 18, in which the pin-holes are arranged randomly.

* * * * *